United States Patent Office 2,977,511
Patented Mar. 28, 1961

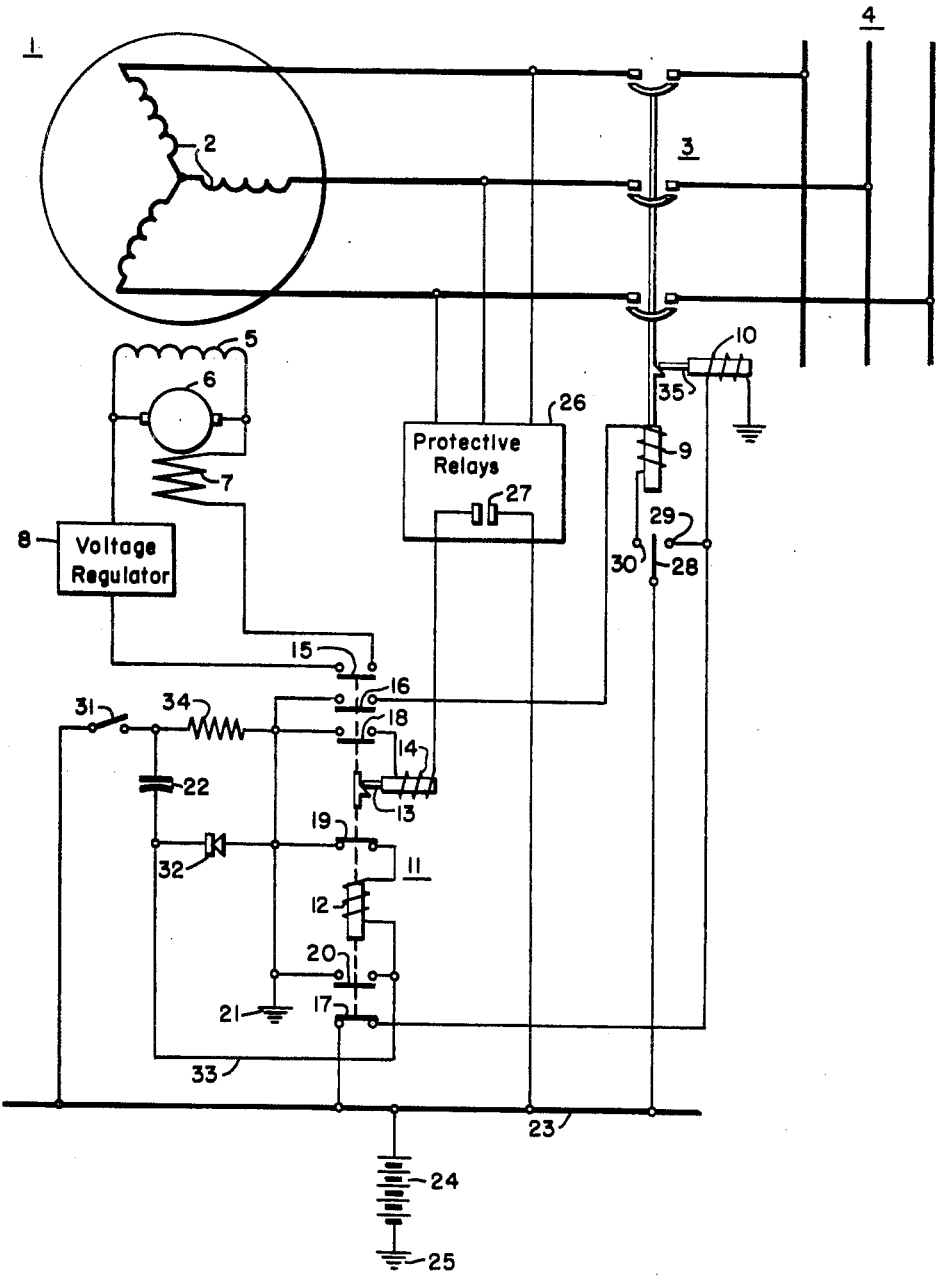

2,977,511

STATIC LOCKOUT CONTROL OF A LATCH TYPE RELAY

James R. Reeder and Glenn W. Ernsberger, Lima, Ohio, assignors to Westinghouse Electric Corporation, East Pittsburgh, Pa., a corporation of Pennsylvania Filed Mar. 20, 1958, Ser. No. 722,664

2 Claims. (Cl. 317—54)

The present invention relates to control circuits for relays and more particularly to a static control circuit for preventing the cycling of latch type relays.

While the invention is not necessarily limited in its use to any particular application of latch type relays, it is especially suited for use with such relays in alternating current generator systems for aircraft. A latch type relay is frequently used for controlling the generator circuit breaker which must trip in response to fault conditions. In such a system, it is essential to prevent cycling of the relay under fault conditions. Without this feature the relay would cycle from open to closed until some part of the system was destroyed. Thus an anticycling means for latch type relays is essential in order to protect the system loads from transients and to prevent damage of the generator system.

In many conventional control circuits for aircraft generators, either an additional lockout relay or a mechanical lockout feature on the latch relay is used to prevent cycling of the latch relay. The additional lockout relays add cost, weight and complexity to the control system. The alternative of using a mechanical lockout feature mounted on the latch type relay itself increases the size and weight of the relay necessary to accommodate the intricate mechanical lockout mechanism. Furthermore, the conventional devices used with latch type relay circuits in aircraft applications do not provide as high a degree of reliability as desired. The conventional devices are complicated and difficult to build and are often unable to maintain accurate calibration because of the vibration, mechanical shock and wide variations in temperature gradients encountered in aircraft service. The moving parts of the mechanical devices are subject to unavoidable wear requiring extensive maintenance, time and expense.

An object of the present invention is to provide a control circuit for latch type relays which will be very small and compact but which is highly reliable while avoiding the disadvantages of the conventional systems outlined above.

Another object of the present invention is to provide a static control circuit for a latch type relay preventing cycling of the relay during fault conditions.

Another object of the present invention is to provide a static lockout circuit for a latch type relay capable of use with any latch type relay and requiring a minimum of parts, space and weight.

Further objects and advantages of the present invention will be more fully understood from the following detailed description of a typical embodiment, taken in connection with the accompanying drawing, the sole figure of which is a schematic diagram showing an illustrative embodiment of the invention in an aircraft alternating current generator system.

The invention is shown embodied in a control system for an alternating current generator 1 which may be of any suitable physical construction and which is shown as having a three-phase armature winding 2. One end of each of the phase windings 2 is brought out of the machine and connected to a circuit breaker 3 which makes connection to a three-phase load bus 4. The circuit breaker 3 may be of any suitable type but is shown as being a latch type breaker having a closing coil 9 and trip coil 10. The generator 1 has a generator field winding 5 supplied with direct current excitation from an exciter 6 of any suitable type. The exciter 6 is shown, for the purpose of illustration, as being a direct current exciter with a self-excited shunt field winding 7. It is to be understood, however, that the exciter 6 represents any suitable type of exciter or excitation system and is preferably provided with a voltage regulator 8 of any suitable type, which has not been illustrated in detail since it is not a part of the invention. The construction of the exciter 6 may be of any suitable physical arrangement. The excitation circuit of the generator 1, and the circuit breaker 3, are controlled by a generator control relay 11.

We have chosen to illustrate our invention by means of the generator control relay 11 since this relay is usually of the latch type. The latch type feature is necessary for this relay so that it will stay in position if direct current control power is lost, thus preventing simultaneous loss of alternating current power. A number of auxiliary contacts used for interlocking purposes, are also actuated by this relay.

The generator control relay 11 is shown as a latch type relay having a closing coil 12 which actuates the relay to the closed position when energized and a latching mechanism 13 of any suitable type which latches the relay in the closed position. A trip coil 14 is provided to release the latch 13 to permit the relay to return to the open or tripped position.

The generator control relay 11 has a relay contact 15 connected in series with the self-excited shunt field winding 7 of the direct current exciter 6 so as to interrupt the circuit of the exciter field winding when the relay 11 is in the tripped position. The control relay 11 has a normally open contact 16 connected to the closing coil 9 of the circuit breaker 3 and a normally closed contact 17 connected to the trip coil 10 of the circuit breaker 3. A normally open auxiliary contact 18 is in series with the relay trip coil 14. A normally closed auxiliary contact 19 is in series with the relay closing coil 12 while a normally open contact 20 provides means for quickly charging a capacitor 22. The function of the capacitor 22 and its relation to the invention are described hereinafter.

The circuit breaker 3 and control relay 11 are preferably designed for operation on direct current, and their closing and trip coils are shown as being energized from a direct current bus 23, which may be supplied with direct current from any suitable source, shown diagrammatically as a battery 24 having one terminal connected to the bus 23 and the other terminal connected to ground at 25.

The complete generator control system illustrated also includes suitable protective relays, indicated at 26. The protective relaying system itself is not a part of the present invention, and the relays have been indicated diagrammatically to avoid unnecessary complication of the drawing. It will be understood that protection must be provided against various types of faults, and other abnormal conditions, such as internal faults in the generator 1, faults on the feeders between the generator 1 and the circuit breaker 3, over-voltage and overexcitation of the generator 1, and possibly other conditions. Any suitable type of relay means or static fault sensing means may be provided for this purpose, one suitable arrangement being shown, for example, in a copending application of James R. Reeder et al., Serial No. 653,592, filed April 18, 1957, now Patent No. 2,885,568, issued May 5, 1959. Whatever type of system may be used, however, it is arranged to close a contact or contacts, shown at 27, upon the occurrence of a fault, to connect the relay trip coil 14 to the direct current bus 23 or otherwise to apply a tripping signal to the relay trip coil 14.

Manual control of the circuit breaker 3 is provided by a generator switch 28 having a contact 29 connected to the circuit breaker trip coil 10 and a contact 30 connected to the circuit breaker closing coil 9. The manual generator switch 28 is connected to the direct current bus 23 so that completion of the remainder of either the closing coil 9 circuit or the trip coil 10 circuit will energize the selected coil and thereby operate the circuit breaker 3. Manual control of the generator control relay 11, which must be closed before the circuit breaker 3 can put the generator 1 on the three-phase load bus 4, is provided by a manual reset switch 31 which is preferably of the momentary contact type. Switch 31 provides operation of the generator control relay 11 in accordance with the present invention.

As previously explained, it is desired to prevent cycling of the generator control relay 11 upon fault conditions in the generator system. Therefore, a means for locking out the generator control relay upon occurrence of a fault is generally provided. In an aircraft system, for which the present invention is particularly intended, such means for locking out a latch type relay such as the generator control relay 11 must be of minimum weight and complexity with maximum surety of operation.

In accordance with the present invention, the capacitor 22 is connected in series through a conductor 33 with the closing coil 12 and the auxiliary contact 19 to ground 21, and is energized by the direct current bus 23 upon closing of the manual reset switch 31. It can be seen that upon closing the manual reset switch 31, a direct current signal is provided causing a surge of current to flow through the capacitor 22, the closing coil 12, and the relay contact 19. The capacitor 22 will quickly charge, or store energy, so as to allow no further current flow through the capacitor 22. The capacitor 22 will thereafter block the direct current signal to the closing coil 12 until the manual reset switch 31 opens thereby removing the direct current signal from the capacitor. A rectifier 32 and a resistor 34 are connected across the capacitor 22 to allow the capacitor to discharge and dissipate its energy in the resistor 34 when the reset switch 31 reopens. In this manner, the generator control relay 11, which is of the latch type, will be effectively locked out and the closing coil 12 will be incapable of receiving further direct current signals for closing the control relay 11 until the manual reset switch 31 has opened allowing discharge of the capacitor 22. Unless capacitor 22 is discharged and its energy dissipated, no further signal can pass to the relay closing coil 12.

The operation of this control system may be briefly described as follows. The system is shown in the drawing in its deenergized condition. When it is desired to start the generator 1, the control relay 11 is actuated to its closed position by closing the manual reset switch 31. This allows a direct current signal from the direct current bus 23 to momentarily flow through the capacitor 22 and through the relay closing coil 12, since the auxiliary contact 19 is initially in the closed position. When the control relay 11 is actuated to its closed position, contact 19 opens and contacts 18 and 20 close. Capacitor 22 continues to charge to the full bus voltage through the contact 20 and the direct current signal current through the capacitor 22 drops to zero. The control relay 11 is thus actuated to its closed position and latched by the latching mechanism 13. As soon as the reset switch 31 reopens the capacitor 22 will discharge thereby resetting the closing circuit to the control relay 11.

If no trip signal is present on the trip coil 14, the control relay 11 will remain in the closed positon.

In this position, the relay contact 15 closes to complete the circuit of the exciter field winding 7, and the contact 16 closes to partially complete a circuit for the closing coil 9 of the circuit breaker 3. The exciter 6 can then build up its voltage and supply excitation to the generator field winding 5, and as the generator 1 is brought up to speed, its voltage comes up to the normal value under control of the voltage regulator 8. When it is desired to connect the generator to the three-phase load bus 4, the manual generator switch 28 is placed momentarily on the contact 30 which completes the energizing circuit of the circuit breaker closing coil 9, so that the breaker 3 closes to connect the generator 1 to the bus 4.

The system is now in its normal operating condition. If it is desired to remove the generator 1 from the bus 4 without deenergizing the generator, the manual generator switch 28 may be placed on the contact 29, thereby completing a circuit from the direct current bus 23 to the trip coil 10 and releasing a latching mechanism 35 to trip the breaker 3. The breaker 3 may thus be tripped and reclosed as desired by means of the generator switch 28 without deenergizing the generator 1.

If a fault condition occurs during normal operation of the system, the protective relays 26 operate to close the contact 27. This completes a circuit through the closed contact 18 to the relay trip coil 14 of the relay 11, so that the trip coil 14 is actuated by the potential on the direct current bus 23. The relay 11 is thus tripped and returns to the position shown in the drawing. When this occurs, the contact 17 returns to its closed position to complete a circuit to the trip coil 10 of the circuit breaker 3 so that the breaker is tripped to disconnect the generator 1 from the load bus 4. At the same time, the relay contact 15 opens to interrupt the circuit of the exciter field winding 7. In this way, the generator 1 is removed from the bus 4 and field excitation is removed from the generator.

At this time, the closing coil 12 will receive no further signal since the reset switch being of the momentary contact type, has returned to the open position. As explained previously, the reopening of the reset switch 31 allowed the capacitor 22 to discharge through the resistor 34 thereby resetting the static lockout circuit so as to be ready to allow passage of a direct current signal through the capacitor 22 to the relay closing coil 12 whenever the manual reset switch 31 is again closed. Should the fault condition persist on the system, the relay 11 will momentarily close upon closing of the manual reset switch 31, be tripped by the trip coil 14 and remain locked out until the manual reset switch 31 is opened and then closed again.

Should the fault condition exist upon start up of the system, and the operator continues to hold the manual reset switch 31 in its closed position thereby not allowing it to reopen, the control relay would be actuated to its closed position and then tripped by the fault signal to its trip coil 14. The closing coil 12 will receive no further signal because the capacitor 22 remains charged, allowing no current signal to pass through it. The potential on the direct current bus 23, being equal to the potential across the capacitor 22, allows no dissipation of the energy stored in the capacitor 22 through the resistor 34. Neither can the capacitor 22 discharge through the rectifier 32 since it provides blocking means preventing the capacitor 22 from discharging to ground 21. This means the relay 11 having tripped, remains tripped, regardless of the direct current bus potential which is continuously applied to the capacitor 22. Without this feature, the relay 11 would cycle until some part of the system was destroyed.

It will be seen, therefore, that a very effective lockout circuit is provided for the generator latch type control relay 11, and that this result is accomplished in a very simple manner with a minimum of additional complication, expense and weight. The lockout feature is completely static with all the attendant advantages thereof. A specific embodiment of the invention has been shown for the purpose of illustration, but it will be apparent that the invention is not limited to the specific embodiment shown. Thus, for example, the invention is not limited to the particular system disclosed, but may be applied to any type of latch relay, or otherwise, where it is possible that a closing and trip signal might be simultaneously applied. It is to be understood that while one capacitor and one rectifier has been used in our illustration, the present invention could embody any plurality of capacitors or rectifiers in any suitable circuit configuration. Similarly, although the invention has been described with particular reference to an aircraft generator system, it will be obvious that its usefulness is not necessarily limited to this specific application, but may be used in conjunction with any ordinary latch type relay to provide lockout when so desired.

We claim as our invention:

1. In combination, a relay having electrically energized closing means for actuating the relay to closed position and having tripping means for actuating the relay to open position, an energizing circuit for said closing means, means for applying a direct current energizing signal to the energizing circuit to effect actuation of the relay, a capacitor connected in series in the energizing circuit to permit momentary current flow upon application of said energizing signal, contact means operative upon actuation of the relay to closed position to interrupt the energizing circuit and to establish a circuit for charging the capacitor directly from the energizing signal, whereby the capacitor is fully charged to block current flow thereafter until the energizing signal has been removed.

2. In combination, a relay having electrically energized closing means for actuating the relay to closed position and having tripping means for actuating the relay to open position, an energizing circuit for said closing means, means for applying a direct current energizing signal to the energizing circuit to effect actuation of the relay, a capacitor connected in series in the energizing circuit to permit momentary current flow upon application of said energizing signal, contact means operative upon actuation of the relay to closed position to interrupt the energizing circuit and to establish a circuit for charging the capacitor directly from the energizing signal to prevent further current flow after the capacitor is fully charged, and a discharge circuit for said capacitor effective upon removal of the energizing signal to permit discharge of the capacitor.

References Cited in the file of this patent

UNITED STATES PATENTS

| | | |
|---|---|---|
| 2,394,039 | Brown et al. | Feb. 5, 1946 |
| 2,484,247 | Ratz | Oct. 11, 1949 |
| 2,534,115 | Favre | Dec. 12, 1950 |
| 2,784,353 | Holmes | Mar. 5, 1957 |
| 2,832,917 | Clausing | Apr. 29, 1958 |

FOREIGN PATENTS

| | | |
|---|---|---|
| 177,105 | Switzerland | Aug. 1, 1935 |